Copper Coating

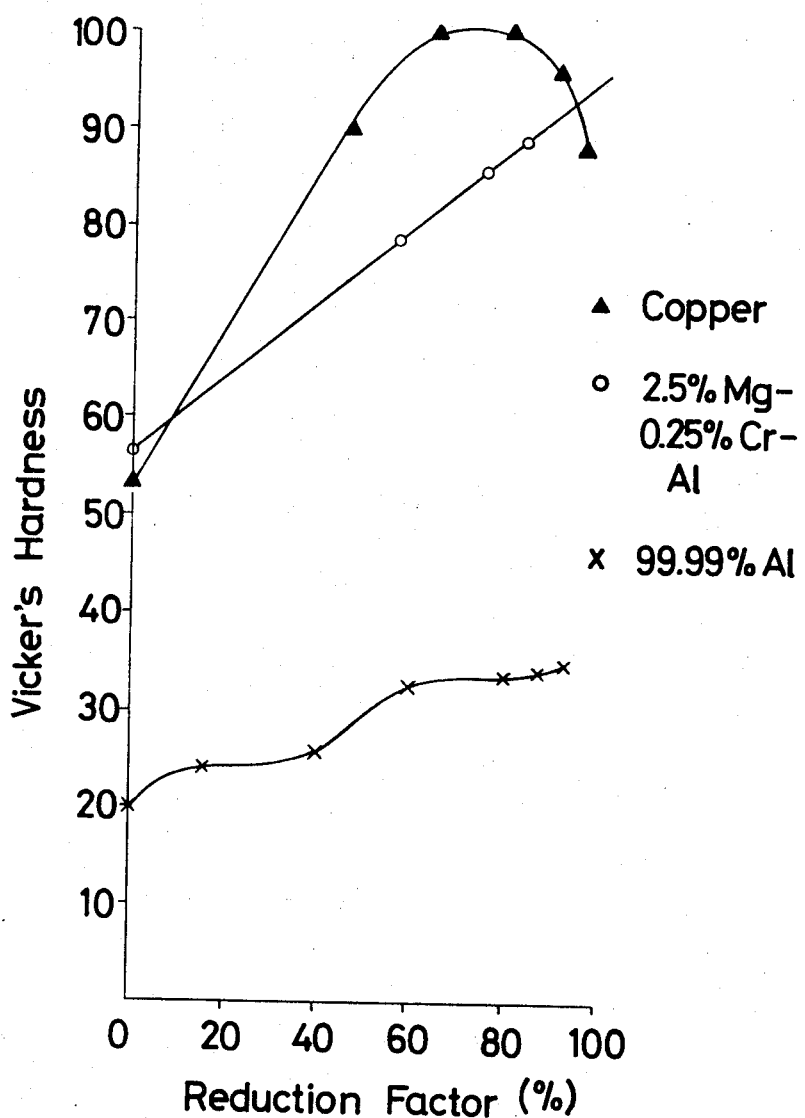

Aluminum Coating
(Not less than 99.995% Al)

Current-Voltage
Thermal Hysterisis

Aluminum Alloy etc.

Aluminum Alloy etc.

United States Patent Office 3,714,371
Patented Jan. 30, 1973

3,714,371
ALUMINUM CLAD MULTIPLEX SUPERCONDUCTOR
Harehiko Nomura and Susumu Shimamoto, Tokyo, Japan, assignors to Agency of Industrial Science & Technology, Tokyo, Japan
Filed Dec. 27, 1971, Ser. No. 212,199
Claims priority, application Japan, Dec. 28, 1970, 46/20,120
Int. Cl. H01v 11/00
U.S. Cl. 174—126 CP    3 Claims

ABSTRACT OF THE DISCLOSURE

An aluminum clad multiplex superconductor comprises an aluminum alloy cladding and a multiplex superconductor inserted into the cladding and is constructed with a plurality of unit superconductors twisted or braided with each other, each of which unit superconductors is constructed with a strand of a plurality of superconductive wires, an intermediate aluminum layer and a relatively hard aluminum alloy layer surrounding the intermediate layer. The intermediate aluminum layer serves to prevent the flowing phenonmenon during the wiredrawing of the unit superconductor.

---

The present invention relates to an aluminum clad multiplex superconductor.

Many attempts have been made to obtain electrically and thermally stable properties in electro-magnets etc. which utilize superconductive wires, by providing copper cladding around the superconductive wires. The superconductor, in general, generates considerable heat upon spatial variations of magnetic flux applied thereto with time. If this heat is not discharged promptly to the exterior of the superconductor, the superconductor becomes very unstable, resulting in transition to the normal conductive state. With respect to this point, let us consider the thermal, electrical and magnetic properties of the superconductor when it is provided with copper and aluminum claddings respectively.

Firstly, considering the resistivities of aluminum and copper in the vicinity of liquid helium temperature (4.2° K.), the resistivity of aluminum is $3 \times 10^{-9}$ ($\Omega$ cm.) and that of copper is $1 \sim 2 \times 10^{-8}$ ($\Omega$ cm.) as shown in FIG. 1. As to the thermal conductivities of aluminum and copper in the vicinity of 4.2° K., they are 33 (w./cm.° K.) and 3 (w./cm. ° K.), respectively, as shown in FIG. 2. Further, as to the thermal diffusion coefficient $Dth$ which is defined as (thermal conductivity (K)/specific heat (C) $\times$ specific gravity (d)), those of copper (OFHC, 99.99%) and aluminum (purer than 99.995%) are $0.12 \times 10^4$ and $43 \times 10^4$, respectively. Further, as to the magnetic diffusion coefficient $Dm$ which is defined as (electric resistance $(R)/\mu_0$ (magnetic permability)), that of copper is $1 \sim 2 \times 10^{-8}/\mu_0$ while that of aluminum is $3 \times 10^{-9}/\mu_0$.

As will be clear from the above mentioned properties, since the amount of heat generation tends to increase with the increase of magnetic flux, the magnetic diffusion coefficient acts to soften the flux variation. Assuming the relaxation time with respect to the flux change is put as $\tau$, the relation between $Dm$ and $\tau$ is represented by $Dm \propto 1/\tau$. Accordingly, the heat discharging ratio of aluminum to copper for unit cross area and for unit time becomes as follows:

$$\frac{Dth\ (\text{Al})/\tau\ (\text{Al})}{Dth\ (\text{Cu})/\tau\ (\text{Cu})} \times \frac{2.70}{8.95} \left(\frac{Dth\ (\text{Al})}{Dth\ (\text{Cu})} \Big/ \frac{Dm\ (\text{Al})}{Dm\ (\text{Cu})}\right)$$

$$\times \frac{2.70}{8.95} \simeq 30 \sim 60$$

Since the heat and/or magnetic flux pass through the surface of the superconductor, the value of the ratio for unit coating thickness becomes $\sqrt{30} \sim \sqrt{60}$, that is, the heat discharging capability of aluminum is 5.5~7.7 times that of copper. This means that, when highly pure aluminum is used as a cladding material to obtain the same stability as that obtained by using a copper coating, an aluminum coating of about one-thirtieth of the area and about two elevenths of the thickness of the copper coating are sufficient. The lesser area and thickness provide the following advantages when a super-conductor is multi-wound to form a solenoid.

FIG. 3 shows the current density for the total cross sectional area of the coated superconductor, in percentage, when a unit current I is flowing through the superconductive core line and the cross sectional area ratio of the core line to the coating metal is selected as 1:2. Where the area ratio of the superconductive wire to a copper cladding is 1:4, it is clear from the above consideration that the ratio of the superconductive wire to the pure aluminum can be on the order of 1:0.2 to obtain substantially the same stability as that obtained by the copper cladding. That is, when the pure aluminum is employed with the same sized core wire, the current density for the total cross sectional area of the superconductor can be increased from 17% to 75%, i.e., the current density becomes 4.4 times that obtained with the copper coating. In other words, if pure aluminum is used to obtain substantially the same stability as that obtained by the copper coating, the volume and weight of the solenoid respectively become one fourth and one sixth of those of the solenoid using copper coating. The effect of the higher magnetic field increasing the electric resistance, shown in FIG. 4, i.e., the magneto-resistance effect of highly pure aluminum saturates at $0.6 \times 10^{-8}$ ($\Omega$ cm.) at high magnetic field while that for copper rises to several times the value when no magnetic field is applied. That is, the aforementioned effect is improved for aluminum coating while it is degraded for copper coating.

When the outermost shell of aluminum clad superconductor is used as an anode in an electrolyte and an electric current is passed therethrough, aluminum oxide (electrical insulating film of very hard alumite) can be produced on the surface of the shell. This film has excellent voltage withstanding characteristics and the thermal conductivity thereof in the radial direction through the insulating film to helium, when compared with the conventional polyvinylformal coating on copper cladding, becomes about one thousand times that of the conventional organic film since the thermal conductivity of the organic film is 0.00154 w./cm. ° C. while that of the alumite is 0.164 w./cm. ° C., and the thickness of the alumite can be about one tenth of the organic film.

The reasons aluminum has not been employed in spite of the above described advantages over the conventional materials are as follows:

(1) The mechanical strength, i.e., the tension strength of aluminum is 4 kg./mm.$^2$ at 20° C. and considerably less than that of copper the value of which is 24 kg./mm.$^2$ at 20° C. even though the value of aluminum at 4.2° K. becomes several times that at 20° C.

(2) Since the Vicker's hardness of the superconductive wire (Nb-Ti) is larger than 120 as shown in FIG. 5, there is a very large difference in hardness between the superconductive wire and highly pure aluminum and therefore a large strain may be produced by an electro-magnetic force applied thereto externally.

(3) When a coating of highly pure aluminum is provided directly on a superconductive wire of, for example, Nb-Ti alloy and the resulting superconductor is drawn, only the aluminum coating is stretched due to the extreme difference in hardness therebetween. That is, a "flowing phenomenon" may occur and the superconductive wire and the coating are not both deformed uniformly.

Therefore, a primary object of the present invention is to provide an aluminum clad multiplex superconductor having the above described many advantages in actual use.

Other objects and advantages of the present invention will become apparent from the following description of embodiments of the present invention with reference to the attached drawings, in which:

FIG. 1 shows the temperature vs. electric resistance characteristics of aluminum and copper, FIG. 2 shows the temperature vs. thermal conductivity characteristics of aluminum and copper, FIG. 3 shows the current density, in percentage with respect to a unit current flowing through a superconductive wire when a superconductor constituted with a superconductive wire and a coating of either aluminum or copper is wound to form a fully packed solenoid with a cross sectional area ratio of the wire to the coating being 1:2 and the unit current flowing through the wire is averaged over the total cross sectional area of the wire and the coating, FIG. 4 shows the magneto-resistance characteristics of aluminum and copper and FIG. 5 shows the relation between the workability (area reduction factor) and Vicker's hardness;

Figure 1:
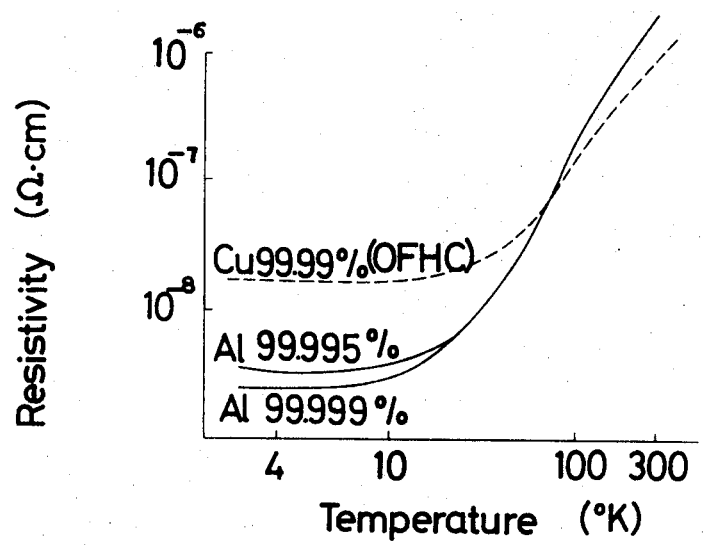
Figure 2:
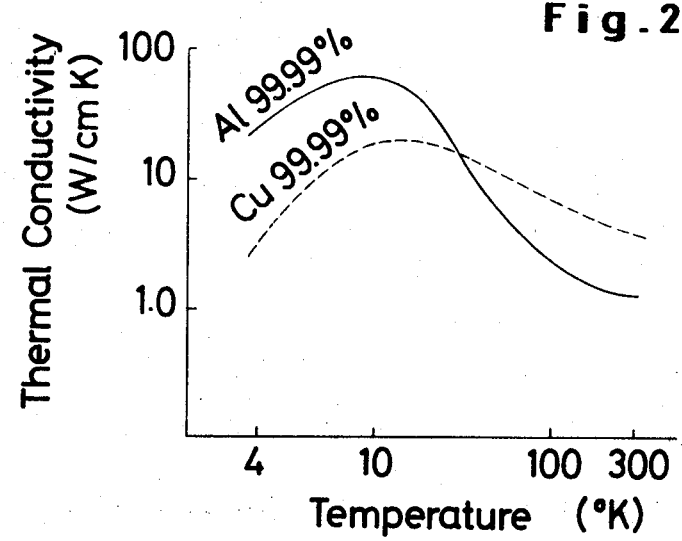
Figure 4:
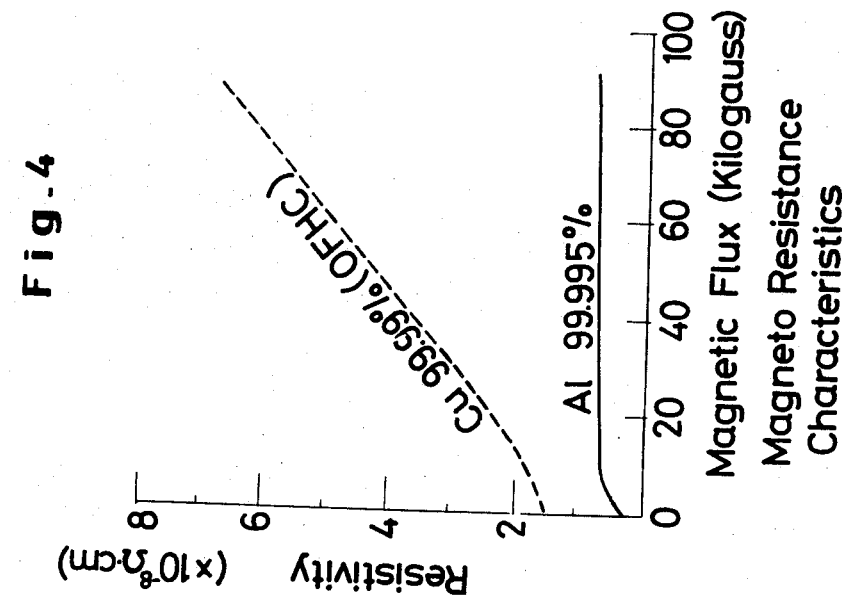
Figure 3:
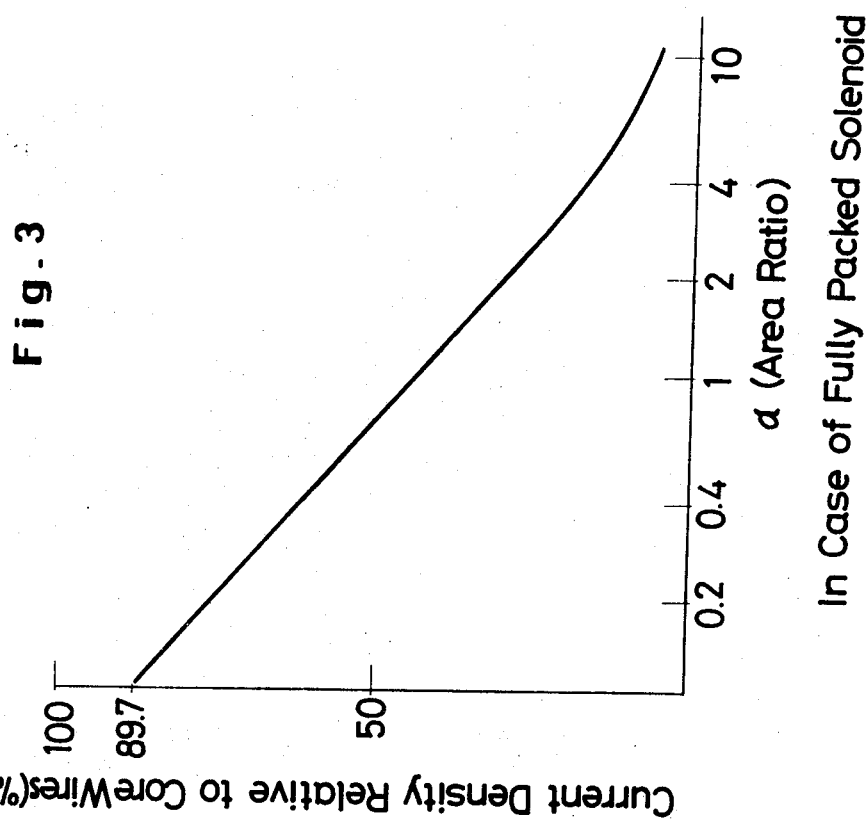
Figure 6:
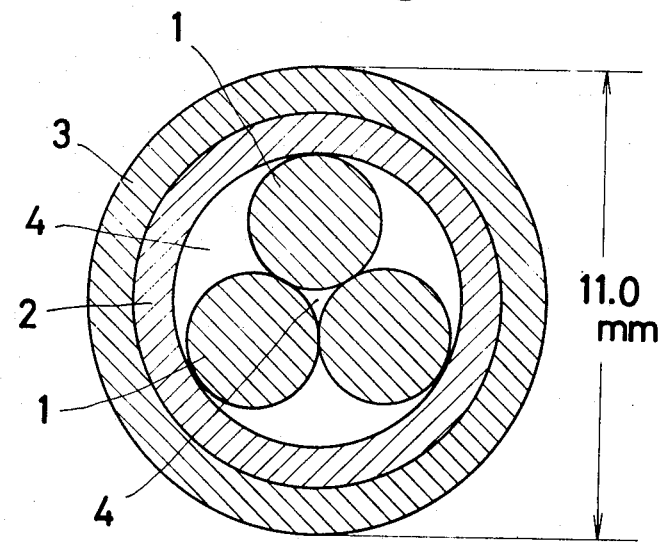
FIG. 6 is a cross section of a unit superconductor according to the present invention prior to the wire-drawing thereof.
Figure 7:
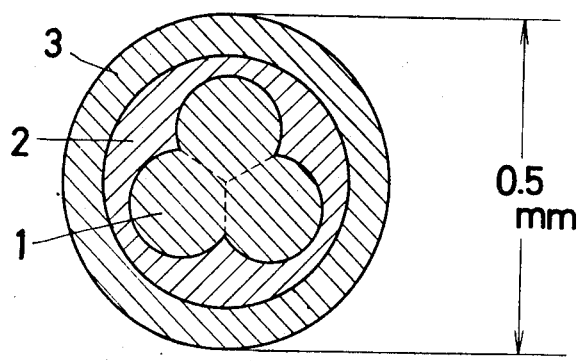
FIG. 7 is a cross section of a unit superconductor according to the present invention after the wire-drawing thereof.

Referring to the drawings, in particular, to FIG. 6, there is shown the fundamental structure of a unit superconductor of the present invention prior to the wire-drawing thereof, in which, in order to prevent the highly pure aluminum cladding from being stretched alone, a strand of three superconductive wires 1 is inserted into a pipe 2 of 99.99% aluminum and then the pipe 2 is inserted into another pipe 3 of aluminum alloy having a suitable hardness, to thereby constitute a triple layer structure. When the unit superconductor having this structure is drawn, the pure aluminum pipe 2 is deformed initially to fill up gaps 4 with a portion of the volume of the pipe 2. In the next stage of the wire-drawing, the "flowing" between the aluminum pipe, the aluminum alloy pipe and the strand of superconductive wires can be restricted to less than 5% when the pipe 3 is made of 2.5% Mg–0.25% Cr–Al alloy, the value of the flowing after the filling up of the gaps with the pure aluminum being determined by he hardness of the aluminum alloy. That is, after the filling up of the gaps 4 and in the intermediate stage of the wire-drawing, a hydrostatic pressure is applied to the outer surface of the superconductive strand causing a force to be exerted on the surface radially inwardly and thus a finished unit superconductor having a surface reduction factor on the order of 95% is obtained as shown in FIG. 7. The mechanical strength of aluminum alloy of this kind is 23 kg./mm.$^2$ which is substantially the same as that of copper.

Figure 8:
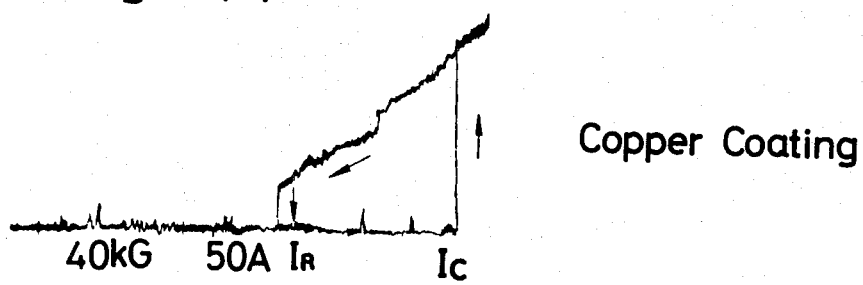
FIGS. 8A and 8B show the current vs. voltage characteristics (thermal hysteresis) of the present unit superconductor constituted with a superconductive wire having a copper and an aluminum coating respectively.
Figure 8:
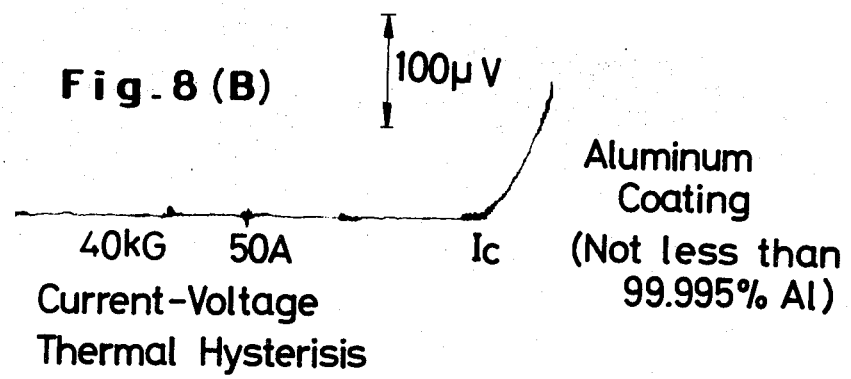

Experimental data of the unit superconductor having copper cladding and the present unit superconductor are shown in FIGS. 8(A) and 8(B) respectively. It will be clear from these data that the unit superconductor having a copper cladding has a thermal hysteresis while the present unit superconductor having aluminum cladding has no thermal hysterisis. In FIGS. 8(A) and 8(B), the data were obtained by standardizing the cross sectional area ratios.

The unit superconductor having aluminum cladding thus produced through the aforementioned process is further worked, in order to make it suitable for use in a large scale electromagnet. Thereafter a plurality of the present unit superconductors each having an aluminum cladding are bundled and twisted, or braided. In this case, in order to completely eliminate any electro-magnetic coupling between the adjacent wires due to any change in magnetic flux density of the magnet, which may cause such unstable phenomena in the superconductor as flux-jumping, diamagnetic current, ununiform current and eddy current, etc., an alumite coating which completely electrically insulates the multiplex superconductor and thermally serves as a short-circuit and which could not be provided heretofore because of the use of organic insulations may be provided on the outer surface of each unit superconductor prior to the multiplexing of them on demand in the manner described before. The multiplex superconductor may be inserted into a sheath of aluminum alloy such as 2.5 Mg–0.25 Cr–Al or Duralumin, etc. or may be surrounded by a sheet of such aluminum alloy, and then pressed or drawn, if necessary.

Since the present multiplex superconductor is made completely of non-organic materials it is clear that it can be heat-treated for a suitable time at a suitable temperature, after the mechanical process for forming the multiplex superconductor structure is completed and/or the alumite forming process for the respective unit superconductors is performed. Since the melting point of the alumite layer is very high, no burning occurs and the mechanical strength thereof is considerably large. The aluminum clad multiplex superconductor fabricated in accordance with the present invention may be further suitably worked. For example, another electric insulator layer having reasonable mechanical strength may be provided electrically on the outer surface of the outermost aluminum sheath. The present multiplex superconductor having aluminum cladding can be easily wound as a solenoid.

Figure 9A:
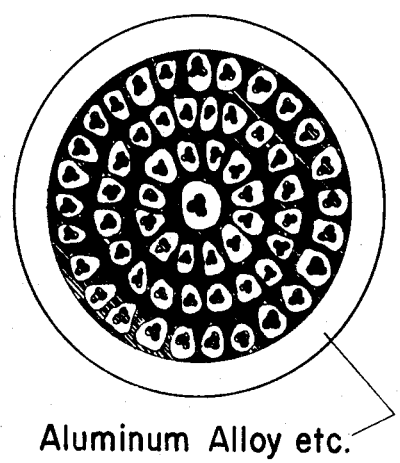
FIGS. 9A and 9B show examples of the present aluminum clad multiplex superconductor constructed with a plurality of the unit superconductors.
Figure 9B:
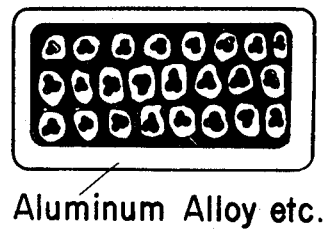

FIGS. 9A and 9B are cross-sectional views of a multiplex superconductor fabricated in accordance with the present invention, the structure of the multiplex superconductor being constituted with a plurality of the unit superconductors each having the triple layer structure. The unit superconductors are inserted into a pipe or sheath of aluminum alloy, etc. (FIG. 9(A)) or surrounded by a sheet of aluminum alloy (FIG. 9(B)). Areas shown in white represent highly pure aluminum and the areas of oblique lines show the aluminum alloy and/or alumite claddings.

As described hereinbefore, the multiplex superconductor fabricated in accordance with the present invention can be widely applied to such electro-magnets as those which are used to produce high magnetic fields and are subjected to a very high Lorentz force, those which are used for maintaining a linear motor in floating condition and are required to be light weight, compact and capable of carrying a very high current density. (In practice, the weight and the volume of a magnet constructed with the present superconductor can respectively be reduced to at least one-sixth and one-fourth those of the conventional magnet) those used for MHD, particle acceleration, spark chambers and bubble chambers, those used for enclosing the plasma of a nuclear fusion reactor, those used for the electric lens of an electron microscope, those used for electric power transmission cable, etc.

What is claimed is:

1. An aluminum clad multiplex superconductor comprising a plurality of unit superconductors bundled and twisted or braided with each other and an aluminum alloy coating surrounding said plurality of unit superconductors, each of said unit superconductors having a triple structure including a strand constructed with three or more superconductive wires, an intermediate layer of highly pure aluminum and an outermost layer of an aluminum alloy having more than 50 of Vicker's hardness.

2. An aluminum clad multiplex superconductor as set forth in claim 1, wherein an electric insulating layer is provided on the outer surface of each said unit superconductor by an alumite treatment before the formation of said multiplex superconductor.

3. An aluminum clad multiplex superconductor as set forth in claim 1, wherein an electric insulating layer is provided on the outer surface of said multiplex superconductor by alumite treatment of the outermost aluminum alloy thereof.

References Cited

UNITED STATES PATENTS

| | | | |
|---|---|---|---|
| 3,643,001 | 2/1972 | Schaetti | 174—126 CP |
| 3,625,662 | 12/1971 | Roberts et al. | 174—DIG. 6 |
| 3,618,205 | 11/1971 | Barber et al. | 174—DIG. 6 |
| 3,614,301 | 10/1971 | Royet | 174—15 C |
| 3,596,349 | 8/1971 | Boom et al. | 174—DIG. 6 |
| 3,509,622 | 5/1970 | Bernert et al. | 174—DIG. 6 |
| 3,638,154 | 1/1972 | Sampson et al. | 174—DIG. 6 |

FOREIGN PATENTS

| | | | |
|---|---|---|---|
| 1,439,812 | 6/1970 | Germany | 174—DIG. 6 |

BERNARD A. GILHEANY, Primary Examiner
A. T. GRIMLEY, Assistant Examiner

U.S. Cl. X.R.

174—15 C, DIG. 6